US006643143B1

(12) United States Patent
Stewart et al.

(10) Patent No.: US 6,643,143 B1
(45) Date of Patent: Nov. 4, 2003

(54) CIRCUIT BOARD WITH LOW PROFILE SWITCH ASSEMBLY

(75) Inventors: Thomas E. Stewart, Saratoga, CA (US); Robert J. Lajara, San Jose, CA (US); Timothy W. Olesiewicz, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 10/342,405

(22) Filed: Jan. 14, 2003

(51) Int. Cl.[7] .................................................. H02B 1/20

(52) U.S. Cl. ....................... 361/828; 361/686; 361/682; 361/792; 439/79; 439/80; 439/620

(58) Field of Search ................................ 361/828, 792, 361/825, 682, 686, 760, 719, 721; 439/79, 80, 620

(56) References Cited

U.S. PATENT DOCUMENTS 4,721,472 A * 1/1988 Gentry et al. ................. 439/79
4,952,758 A * 8/1990 Dara et al. ............... 200/51.09
5,336,109 A * 8/1994 Hillbish et al. .......... 439/541.5
5,643,008 A * 7/1997 Tan et al. ................ 439/541.5
6,457,987 B1 * 10/2002 Yeh ............................ 439/352

* cited by examiner

*Primary Examiner*—David Martin
*Assistant Examiner*—Hung Bui
(74) *Attorney, Agent, or Firm*—Park, Vaughan & Fleming LLP

(57) ABSTRACT

A circuit board assembly that includes a circuit board and a bracket. The bracket has a first flange, a second flange, and a third flange. The first flange and the second flange are coupled to the circuit board. The circuit board assembly also includes a switch mounting board. The switch mounting board is coupled to the third flange of the bracket. The circuit board assembly also includes a first switch and a second switch, which are coupled to the switch mounting board. The circuit board assembly further includes a connector that is coupled to the circuit board. At least a first portion of the connector is positioned between the circuit board and the first switch. At least a second portion of the connector is positioned between the circuit board and the second switch.

21 Claims, 11 Drawing Sheets

CIRCUIT BOARD WITH LOW PROFILE SWITCH ASSEMBLY

1. FIELD OF THE INVENTION

Figure 1:
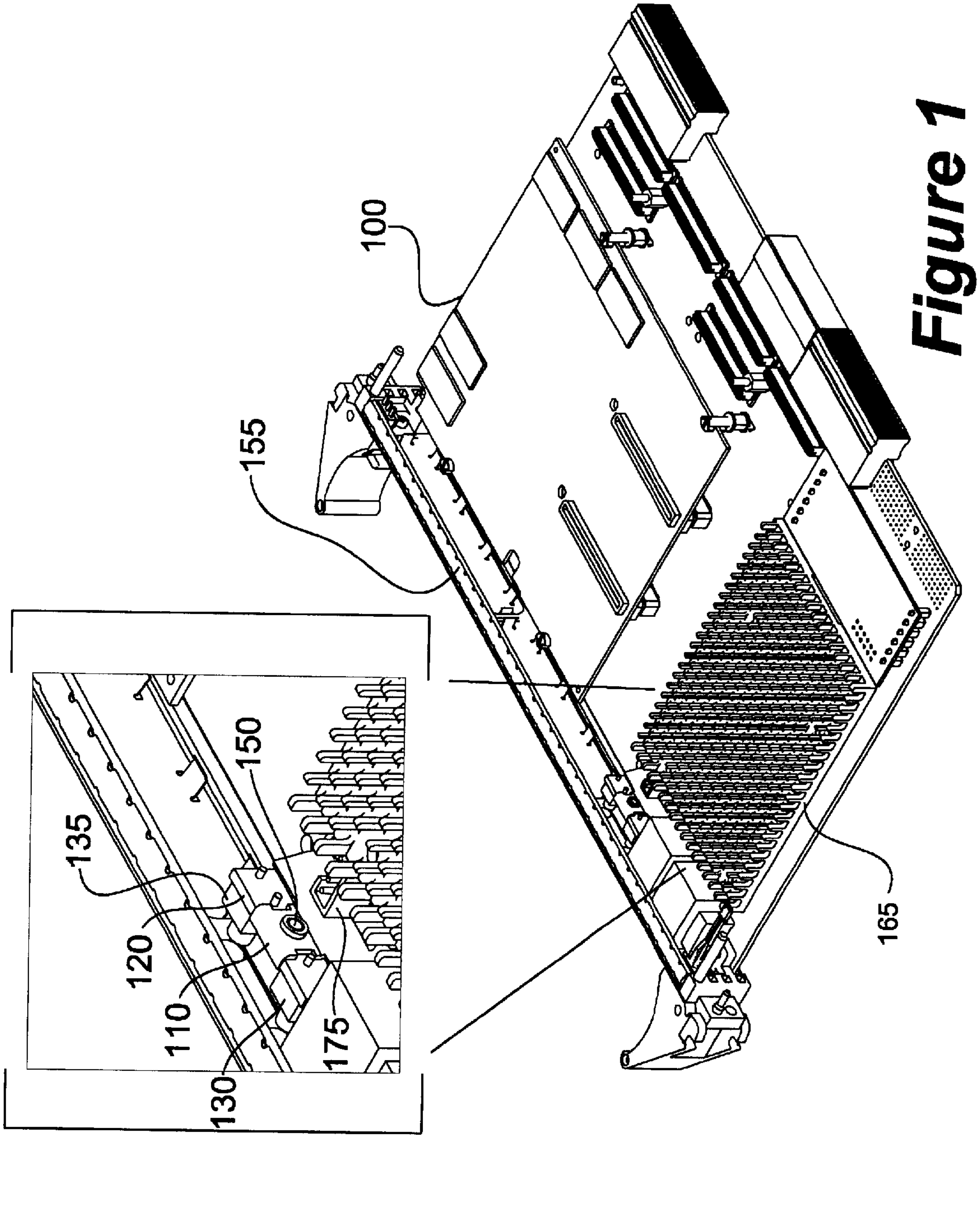

The present invention generally relates to circuit board assemblies. More specifically, the invention relates to circuit board assemblies that are optimized to reduce the height of the circuit board assembly.

2. BACKGROUND

Many modem industrial computer systems are designed so that the functionality of the computer system can be rapidly modified. Instead of utilizing a "motherboard" as found in most desktop computer systems, many modem industrial computers utilize a backplane that includes a number of connectors for receiving circuit board assemblies. These circuit board assemblies can provide a large number of functions. For example such circuit board assemblies may include memory, microprocessors, network interfaces, and/or video. As a result, it is relatively easy to increase functionality of an industrial computer system. One simply installs a circuit board assembly that includes the components needed to provide the additional functionality.

So that a large number of circuit board assemblies from various manufacturers can be installed in backplanes, mechanical and electrical standards for such circuit board assemblies and backplanes have been developed. Several such standards have been developed by the PCI Industrial Computer Manufacturers Group (PCIMIG). Founded in 1994, the PCIMIG is an international consortium of computer product vendors working together to create new design standards for industrial computers. One standard promulgated by PCIMIG, the CompactPCI Specification, Revision 2.0, imposes a 13.71 mm height restriction on the circuit board assembly.

The 13.71 mm height restriction makes it difficult to include some electrical components in CompactPCI compliant circuit board assemblies. For example, installing an electrical connector, such as an industry standard "D-Sub" connector, and one or more switches, which can be accessed via the front panel of the circuit board assembly, can be difficult. Thus, a need exists for a circuit board assembly with a minimal height that includes such components.

3. SUMMARY OF THE INVENTION

One embodiment of the invention is a circuit board assembly that includes a circuit board and a bracket. The bracket has a first flange, a second flange, and a third flange. The first flange and the second flange are coupled to the circuit board. The circuit board assembly also includes a switch mounting board. The switch mounting board is coupled to the third flange of the bracket. The circuit board assembly also includes a first switch and a second switch, which are coupled to the switch mounting board. The circuit board assembly further includes a connector that is coupled to the circuit board. At least a first portion of the connector is positioned between the circuit board and the first switch. At least a second portion of the connector is positioned between the circuit board and the second switch.

Another embodiment of the invention is another circuit board assembly. This circuit board assembly includes a circuit board and a bracket that has a first flange and a second flange. The first flange is coupled to the circuit board. The circuit board assembly also includes a switch mounting board, which is coupled to the second flange of the bracket. The circuit board assembly further includes a switch, which is coupled to the switch mounting board, and a connector. The connector is coupled to the circuit board. At least a portion of the connector is positioned between the circuit board and the switch.

4. BRIEF DESCRIPTION OF THE FIGURES

FIG. 1 presents an isometric view of a circuit board assembly.

Figure 2A:
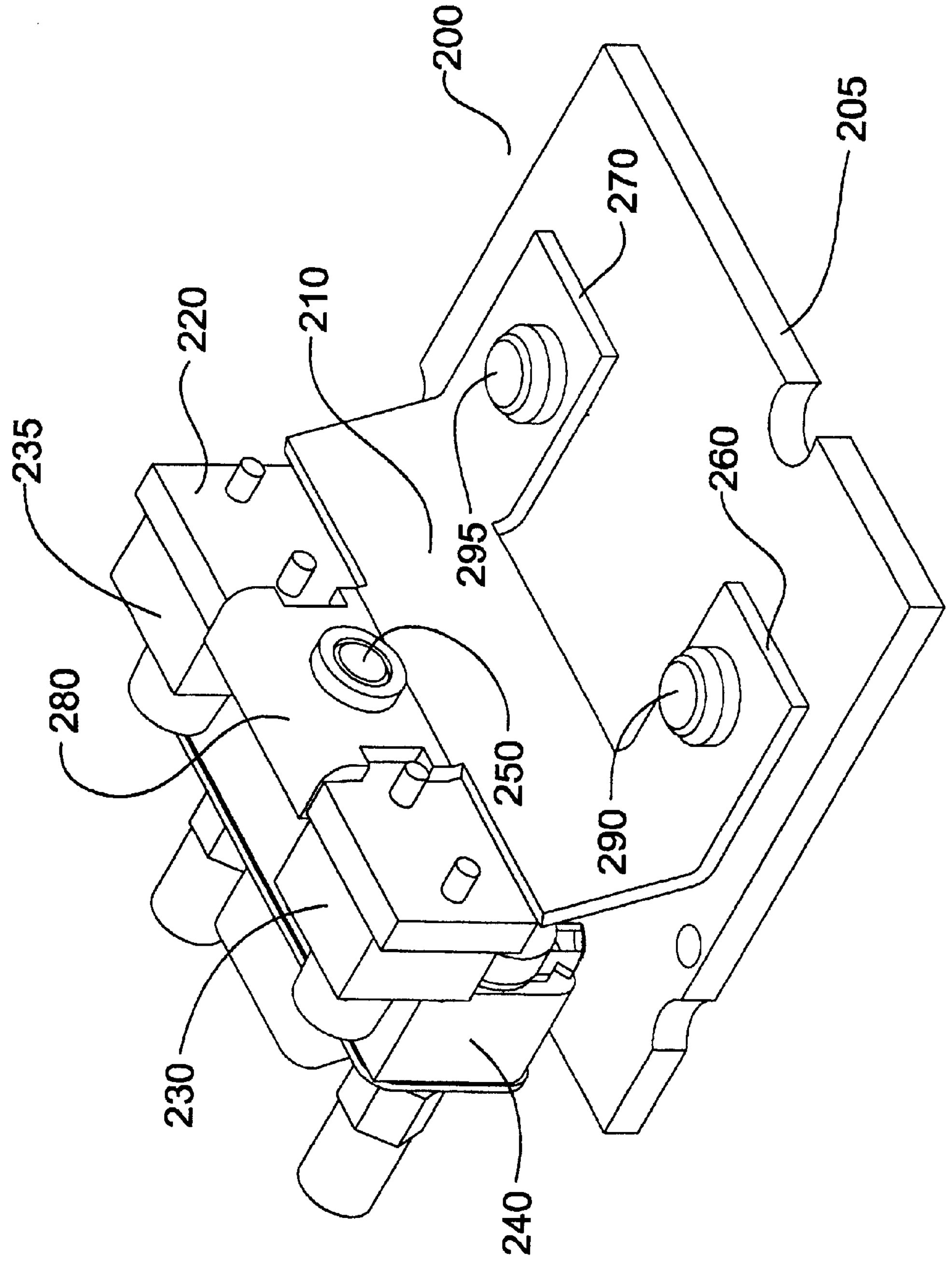

FIG. 2A presents an isometric view of a portion of a circuit board assembly.

Figure 2B:
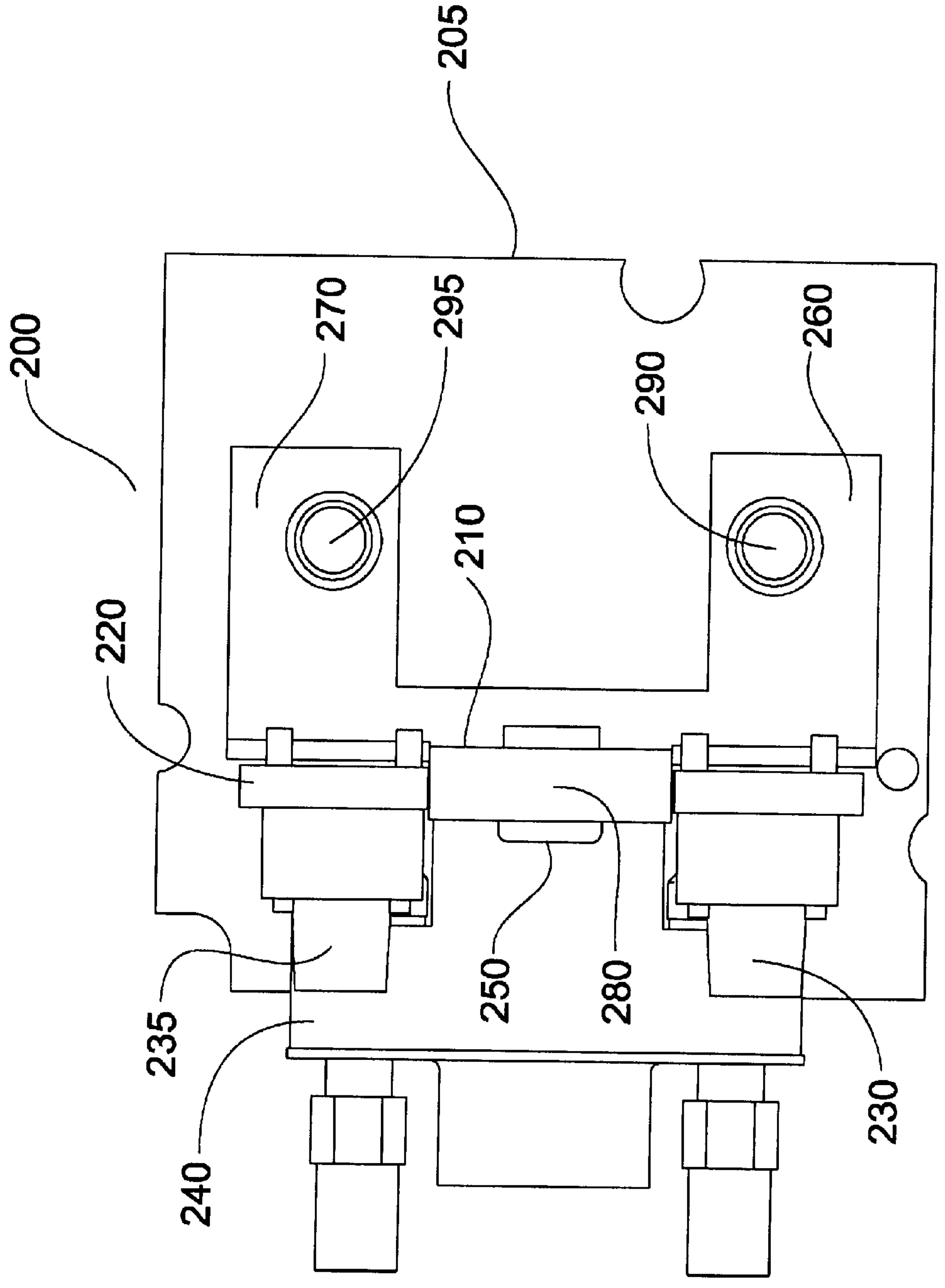

FIG. 2B presents a top view of a portion of a circuit board assembly.

Figure 2C:
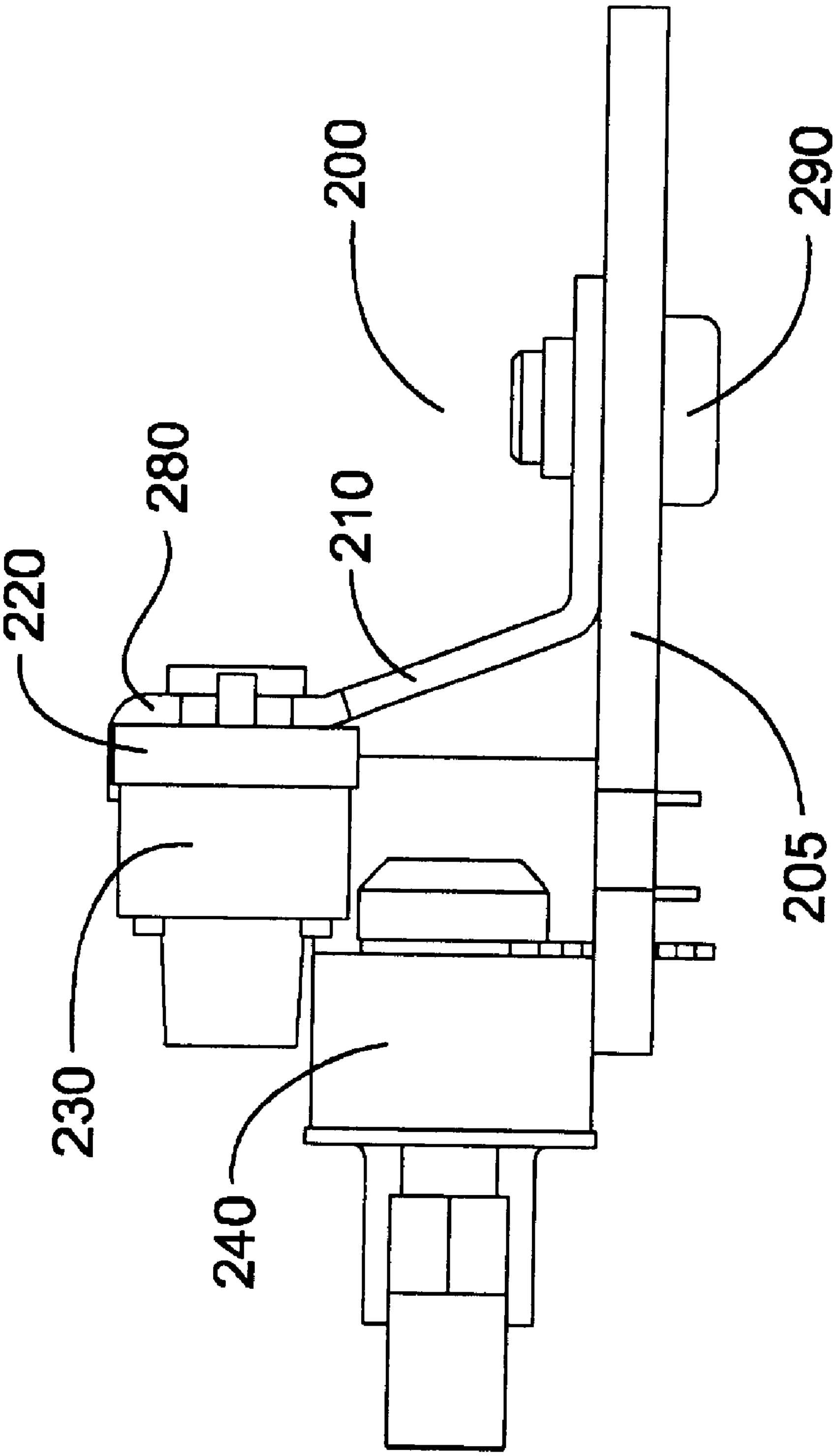

FIG. 2C presents a side view of a portion of a circuit board assembly.

Figure 2D:
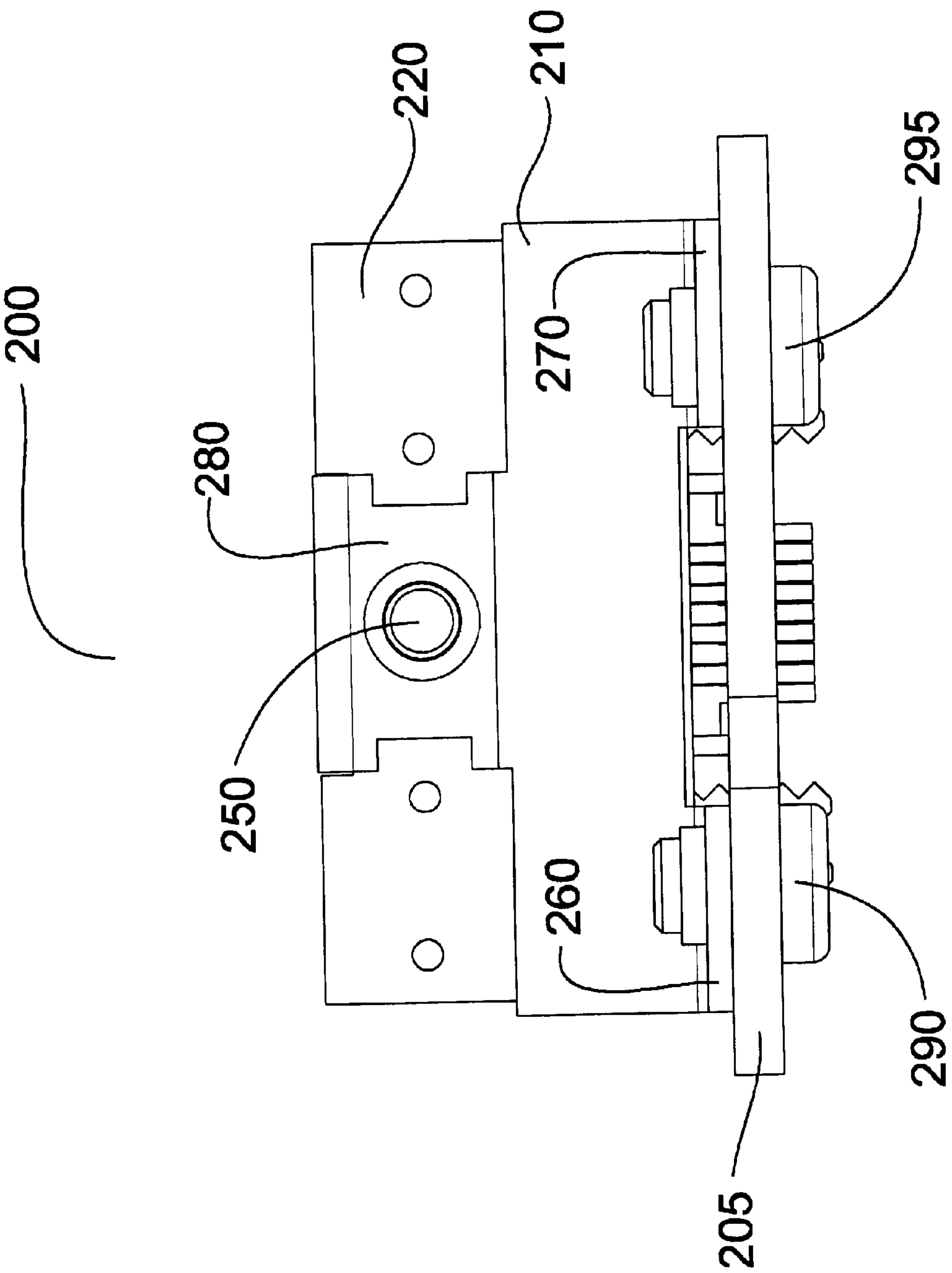

FIG. 2D presents a rear view of a portion of a circuit board assembly.

Figure 2E:
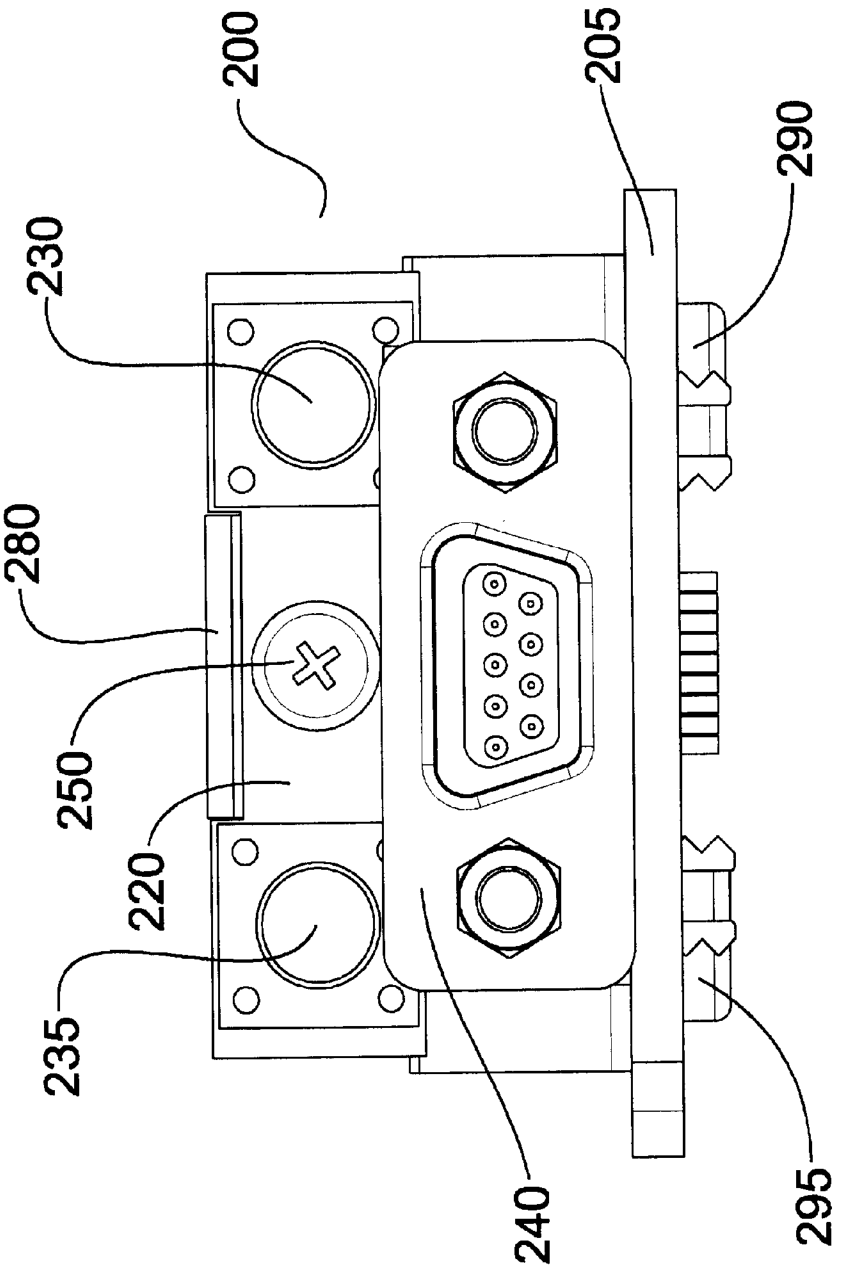

FIG. 2E presents a front view of a portion of a circuit board assembly.

Figure 2F:
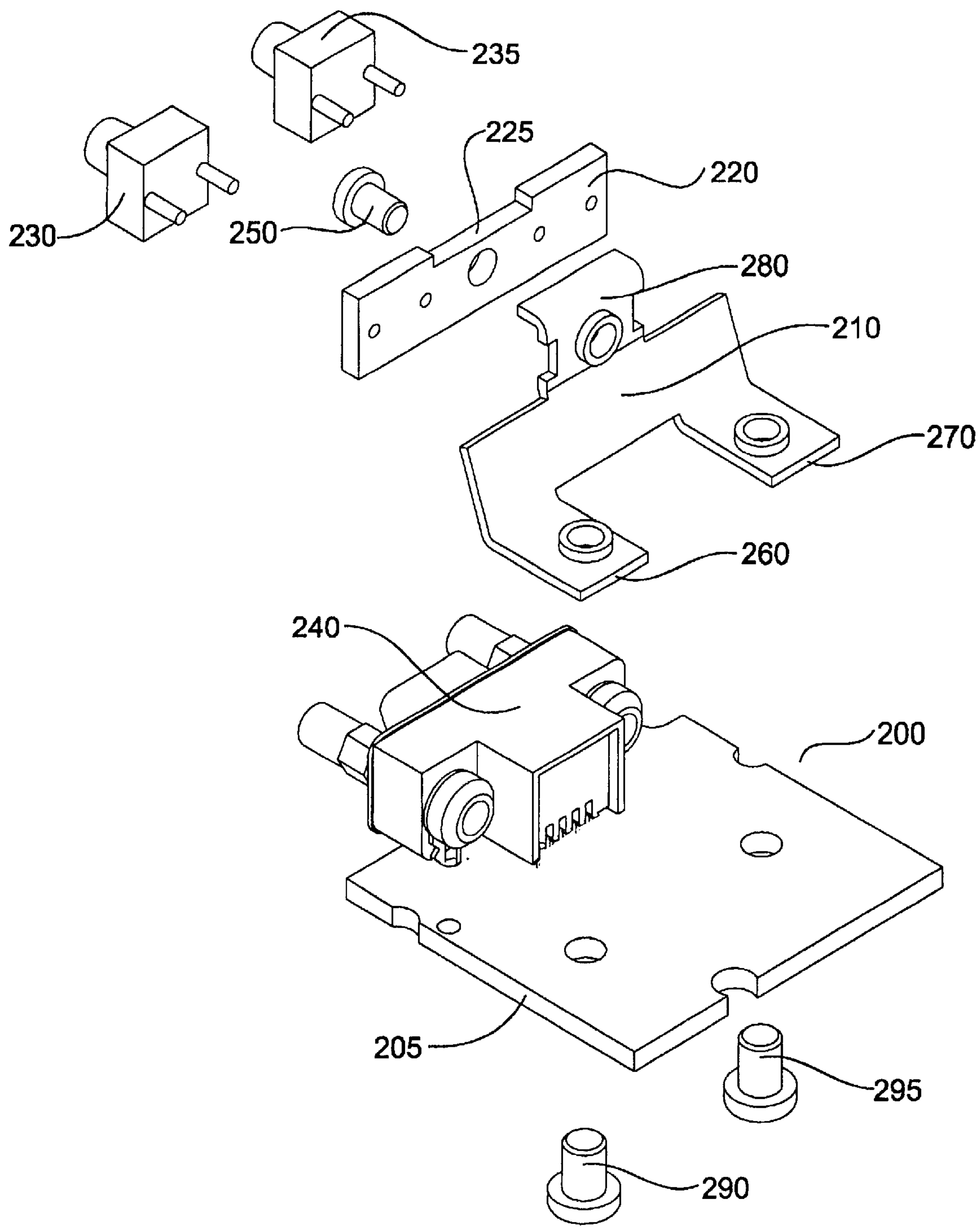

FIG. 2F presents an exploded isometric view of a portion of a circuit board assembly.

Figure 2G:
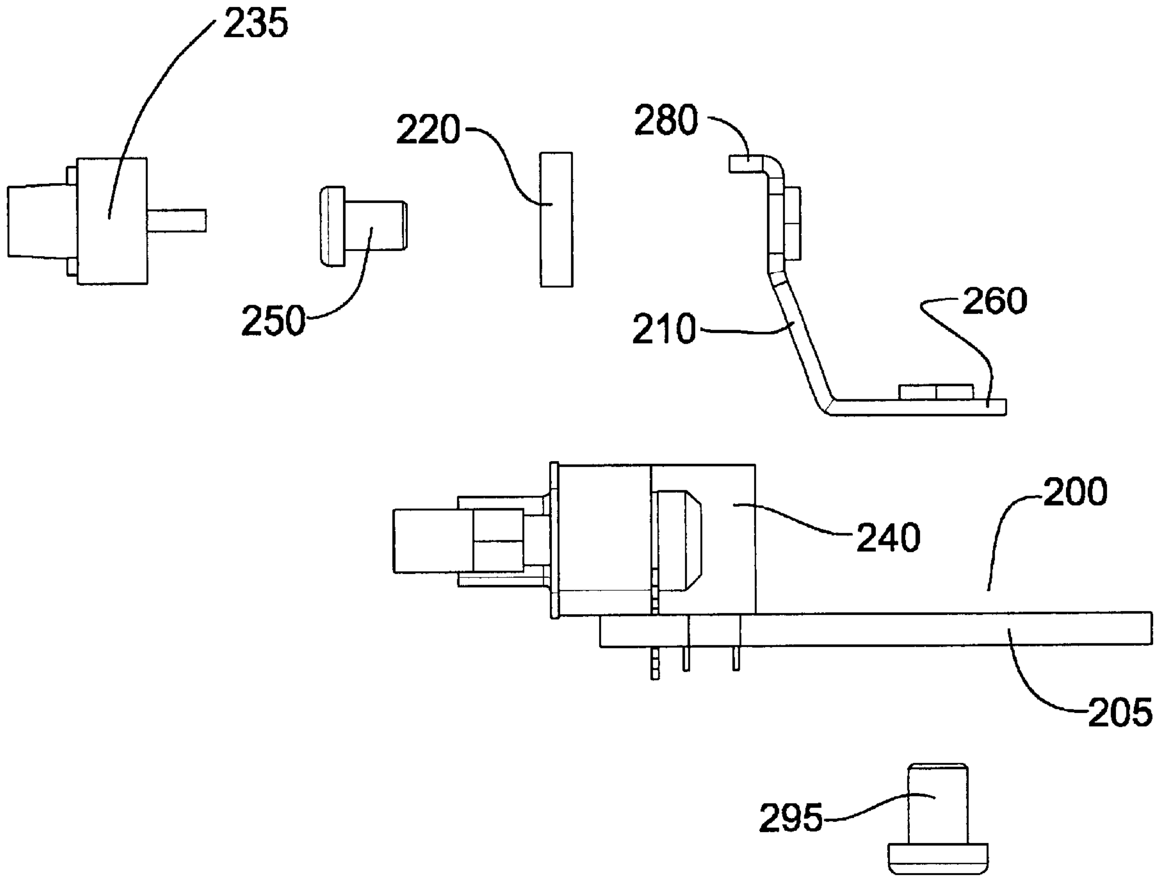

FIG. 2G presents an exploded side view of a circuit board assembly.

Figure 3A:
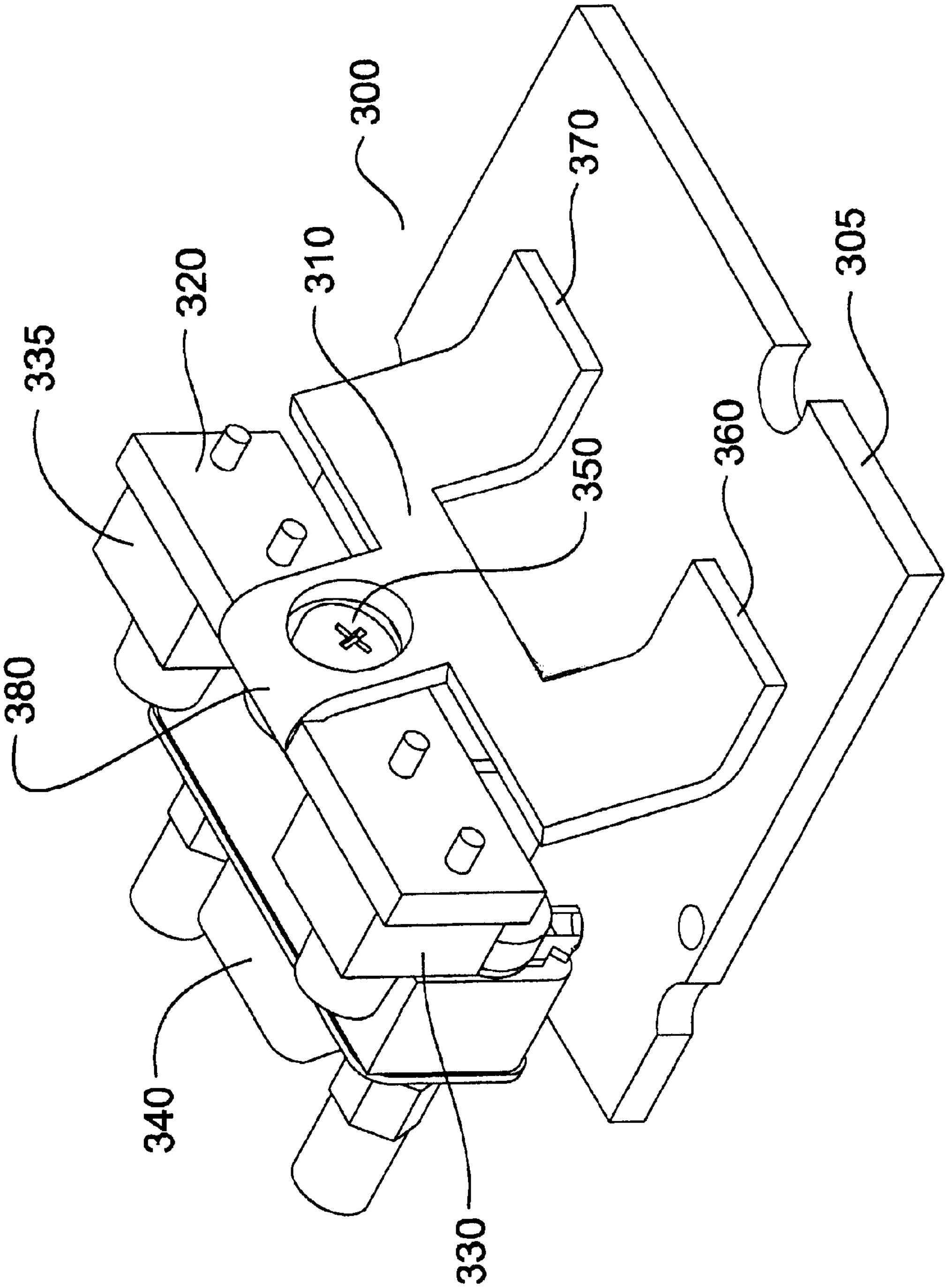

FIG. 3A presents an isometric view of a circuit board assembly.

Figure 3B:
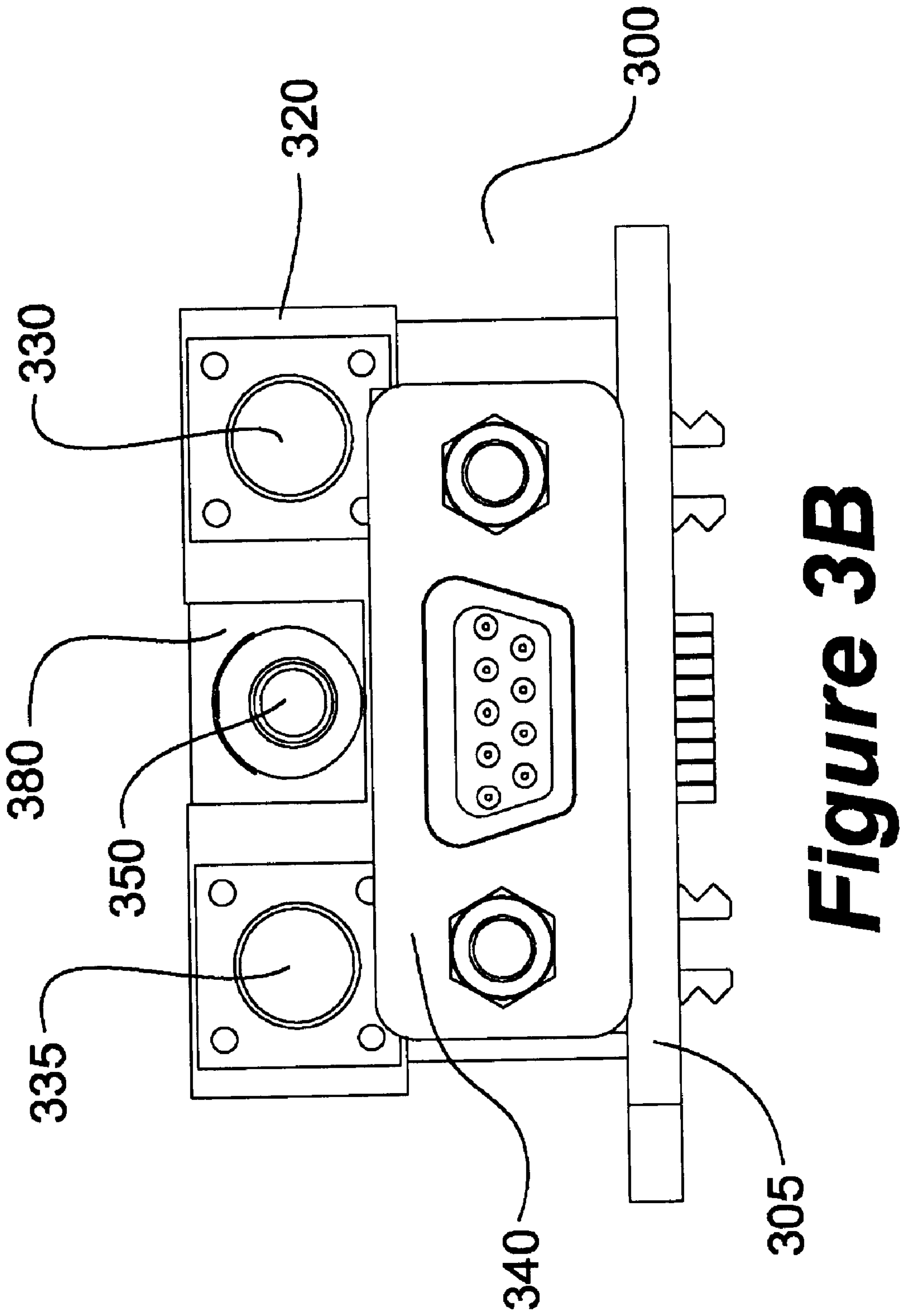

FIG. 3B presents a front view of a circuit board assembly.

Figure 3C:
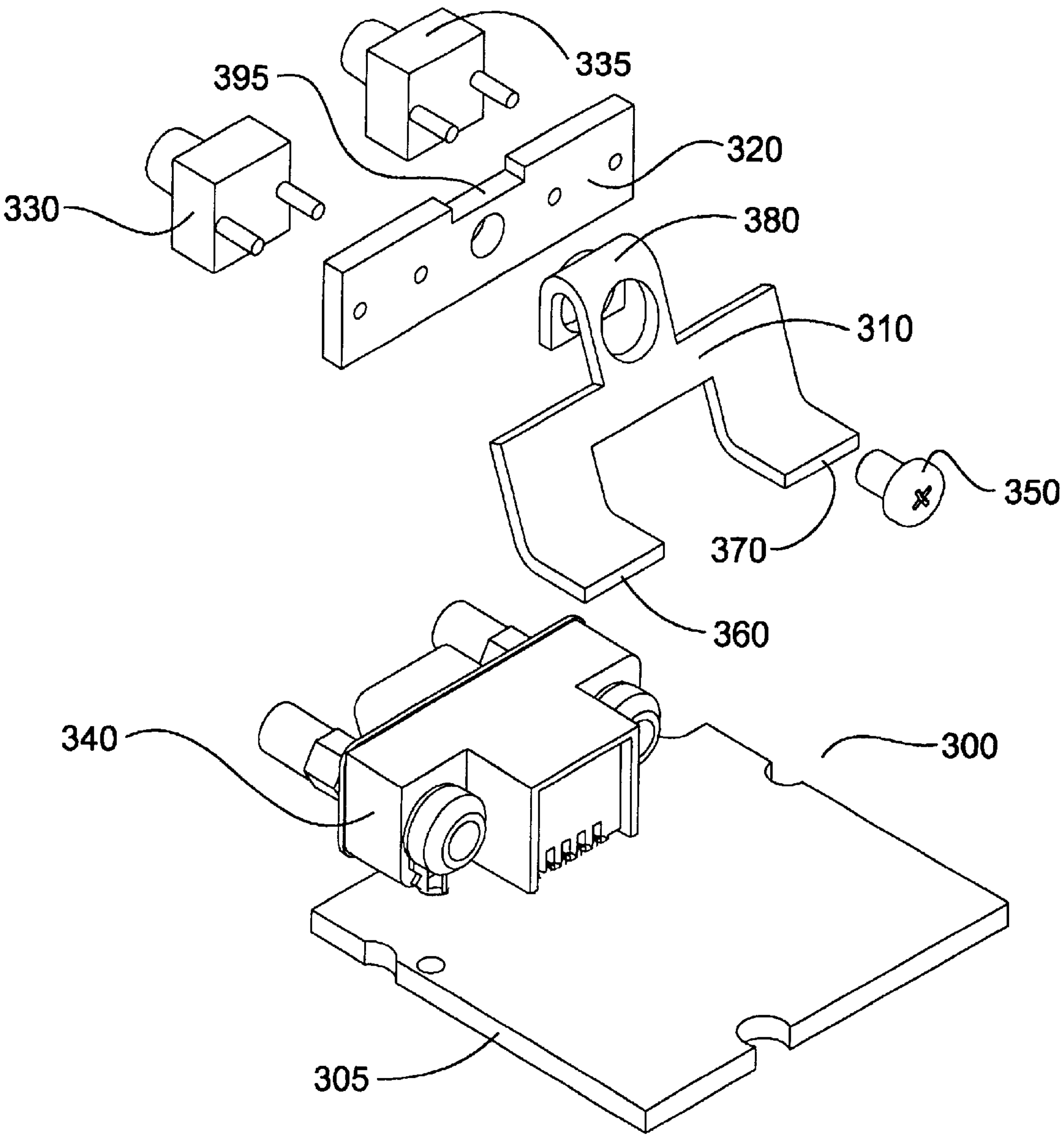

FIG. 3C presents an exploded isometric view of a circuit board assembly.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 A Circuit Board Assembly

One embodiment of the invention is the circuit board assembly 100 shown in FIG. 1. This circuit board assembly 100 is compliant with Revision 2.0 of the CompactPCI Specification.

FIG. 1 presents a full view and a detail view of the circuit board assembly 100. The detail view shows a bracket 110, a switch mounting board 120, a screw 150, and two switches 130 and 135. In some embodiments of the invention the switch 130 is utilized to instruct an industrial computer system to reset a microprocessor (not shown). In such embodiments of the invention switch 135 can be utilized to instruct the circuit board assembly to abort a microprocessor (not shown.).

As shown in FIG. 1, the bracket 110 is located between the front panel 155 and a heatsink 165. In addition, the circuit board assembly includes a switch connector 175, which can receive signals from the two switches 130 and 135 via wires and a mating connector (not shown).

FIGS. 2A–2G present various views of a circuit board assembly 200. Circuit board assembly 200 is a portion of the circuit board assembly 100 shown in FIG. 1. FIGS. 2A–2E present views of the circuit board assembly 200 in an assembled form. In addition, FIGS. 2F and 2G present exploded views of circuit board assembly 200. The front panel assembly 155 and the heatsink 165 from FIG. 1 are not shown in FIGS. 2A–2G so as to not obscure other components.

Circuit board assembly 200 includes a circuit board 205. This circuit board 205 can be a single or multi-layer circuit board. Coupled to the circuit board 205 is a bracket 210. In some embodiments of the invention, the bracket has a first flange 260, a second flange 270, and a third flange 280. The bracket 210 can be manufactured from a sheet of sheet metal. Alternatively, the bracket 210 could be formed from a moldable, nonconductive material, such as plastic.

In some embodiments of the invention, the first flange 260 and the second flange 270 are coupled to the circuit board via fasteners. For example, the flanges 260 and 270 can be coupled to the circuit board 205 via screws 290 and 295. If screws 290 and 295 are utilized to couple the flanges 260 and 270 to the circuit board 205, then spline press nuts, such as are manufactured by Accurate Screw Machine Company, may be utilized to engage the screw threads and retain the screws 290 and 295. In other embodiments of the invention, other fasteners, such as rivets, may be utilized to couple the flanges 260 and 270 to the circuit board 205.

The third flange 280 of the bracket is coupled to a switch mounting board 220. In some embodiments of the invention, the third flange 280 is coupled to the switch mounting board via a fastener. For example, the third flange 280 may be coupled to the switch mounting board 220 via screw 250. In other embodiments of the invention, other fasteners, such as a rivet, may be utilized to couple the third flange 280 to the switch mounting board 220.

As shown in FIG. 2F, in some embodiments of the invention, the switch mounting board 220 includes a notch 225. This notch 225 receives a portion of the bracket's third flange 280. The notch 225 engages the third flange 280 and can prevent rotation of the switch mounting board 220 with respect to the bracket 210. In addition, the notch 225 can provide rapid translational and rotational alignment of the switch mounting board 220 with respect to the bracket 210 during assembly of the circuit board assembly 200.

Referring again to FIG. 2F, the switch mounting board 220 may include a hole for receiving screw 250. In addition, the switch mounting board 220 may include a plurality of other holes for receiving the leads of push button switches 230 and 235. For example, the switch mounting board 220 may include holes sufficient to receive the leads of Hua Jie (Taiwan) Corporation's model TSTC-2 push button switches. In such embodiments of the invention, the leads of the switches 230 and 235 may be soldered to the switch mounting board 220.

In other embodiments of the invention surface mount switches (not shown) could be utilized. In such embodiments of the invention, the switch mounting board 220 could include surface mount pads for soldering to the surface mount switches.

Circuit board assembly 200 also includes a connector 240. This connector 240 can be any connector that provides electrical signals to external hardware. For example, the connector may be an industry standard 9 pin "D-Sub" connector manufactured by Tyco Electronics. Such a D-Sub connector would allow electrical signals of the circuit board assembly 200 to be easily accessed by the circuit board assembly's front panel (not shown).

As shown in FIGS. 2C and 2E, one portion of the connector 240 is positioned between the circuit board 205 and switch 230. In addition, another portion of the connector 240 is positioned between the circuit board 205 and switch 235.

The height of circuit board assembly 200 can be made to be less than or equal to 13.71 mm. Thus, the circuit board assembly 200 can comply with the height restriction of Revision 2.0 of the CompactPCI Specification.

Use of the bracket 210 to support the switches 230 and 235 can also facilitate cooling of electrical components on the circuit board assembly 200 because the bracket 210 only minimally obstructs airflow. In addition, use of the bracket 210 also facilitates the assembly of circuit board assembly 200 because wires from the switches 230 and 235 or the switch mount board 220 can be easily routed around the bracket 210. The simple routing allows for the use of short segments of low gage wires to electrically connect the switches 230 and 235 or the switch mount board 220 to the circuit board 205. Thus, assembly costs can be further minimized.

5.2 A Circuit Board Assembly with a Modified Bracket

FIGS. 3A and 3B present views of another circuit board assembly 300 in an assembled form. In addition, FIG. 3C presents an exploded view of circuit board assembly 300.

Circuit board assembly 300 includes a circuit board 305 that is coupled to a modified bracket 310. The modified bracket has three flanges 360, 370, and 380. The modified bracket 310 can be manufactured from sheet metal or a moldable material such as plastic.

The first flange 360 and the second flange 370 of the modified bracket 310 can be coupled to the circuit board 305 via solder or an adhesive. For example, Master Bond's EP65HP-1 adhesive could be utilized. Because no fasteners are utilized to couple the modified bracket 310 to the circuit board 305, there is no need to drill holes in the first or second flanges 360 or 370 of the modified bracket 310 or the circuit board 305. As a result, routing electrical traces within the circuit board is simpler, and circuit board manufacturing costs can be minimized.

The third flange 380 of the modified bracket 310 is coupled to a switch mounting board 320. For example, the third flange 380 could be coupled to the switch mounting board 320 via a fastener such as a rivet or a screw 350.

As shown in FIG. 3B, the switch mounting board 320 can include a notch 395 for receiving a portion of the third flange 380. This notch 395 can prevent rotation of the switch mounting board 320 and can provide alignment of the switch mounting board 320 during assembly of the circuit board assembly 300. Circuit board assembly 300 also includes two switches that are positioned over a connector, such as a D-Sub connector 340.

The height of circuit board assembly 300 can be made to be less than or equal to 13.71 mm. Thus, the circuit board assembly 300 can comply with the height restriction of Revision 2.0 of the CompactPCI Specification.

5.3 Still Other Modified Brackets

Bracket 210 and bracket 310 both include two flanges that couple to a circuit board. By utilizing two flanges, a connector, such as switch connector 175 of FIG. 1, can be located between the two flanges. By locating such a connector between the two flanges, the length of the wires that connect the switches to the circuit board can be minimized. However, in other embodiments of the invention, a single flange can be utilized to couple the bracket to the circuit board. Such a flange can be coupled to the circuit board via fasteners, solder and/or adhesive.

In still other embodiments of the invention, the switch mounting board would couple to only a single switch, such as a single push button switch.

5.4 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, the bracket could be composed of other materials, and take other shapes other than those described. The circuit board assembly could be located at a different location on the circuit board, but still serve the same functional purpose. There could also be different sized switches, connectors, and switch board mounts that fulfill the same role as the ones described. Additionally, the above disclosure is not intended to limit the present invention. The scope of the present invention is defined by the appended claims.

It is claimed:

1. A circuit board assembly comprising:

a) a circuit board;

b) a bracket having a first flange, a second flange, and a third flange, the first flange and the second flange being coupled to the circuit board;

c) a switch mounting board, the switch mounting board coupled to the third flange of the bracket;

d) a first switch, the first switch coupled to the switch mounting board;

e) a second switch, the second switch coupled to the switch mounting board; and f) a connector, the connector coupled to the circuit board, at least a first portion of the connector being positioned between the circuit board and the first switch, at least a second portion of the connector being positioned between the circuit board and the second switch.

2. The circuit board assembly of claim 1, wherein the first flange of the circuit board is coupled to the circuit board via a first fastener and the second flange of the bracket is coupled to the circuit board via a second fastener.

3. The circuit board assembly of claim 1, wherein at least a portion of the bracket is manufactured from sheet metal.

4. The circuit board assembly of claim 1, wherein the switch mounting board includes a plurality of holes for receiving at least a portion of the first switch and the second switch.

5. The circuit board assembly of claim 1, wherein the switch mounting board includes a notch for receiving at least a portion of the third flange of the bracket.

6. The circuit board assembly of claim 1, wherein the switch mounting board is coupled to the third flange of the bracket via a fastener.

7. The circuit board assembly of claim 1, wherein the switch mounting board is coupled to the third flange of the bracket via a screw.

8. The circuit board assembly of claim 1, wherein the switch mounting board is coupled to the third flange of the bracket via a rivet.

9. The circuit board assembly of claim 1, wherein the first switch is a push button switch.

10. The circuit board assembly of claim 1, wherein the first switch is a push button switch that when depressed, resets a microprocessor that is coupled to the circuit board.

11. The circuit board assembly of claim 1, wherein the first switch is a push button switch that when depressed aborts a microprocessor that is coupled to the circuit board.

12. The circuit board assembly of claim 1, wherein the connector is a D-Sub connector.

13. The circuit board assembly of claim 1, wherein the circuit board assembly complies with Revision 2.0 of the CompactPCI Specification.

14. The circuit board assembly of claim 1, wherein the height of the circuit board assembly is less than 13.71 mm.

15. A circuit board assembly comprising:

a) a circuit board;

b) a bracket having a first flange and a second flange, the first flange being coupled to the circuit board;

c) a switch mounting board, the switch mounting board coupled to the second flange of the bracket;

d) a switch, the switch coupled to the switch mounting board; and e) a connector, the connector coupled to the circuit board, at least a portion of the connector being positioned between the circuit board and the switch.

16. The circuit board assembly of claim 15, wherein the first flange of the bracket is coupled to the circuit board via a fastener.

17. The circuit board assembly of claim 15, wherein the first flange of the bracket is coupled to the circuit board via a screw.

18. The circuit board assembly of claim 15, wherein at least a portion of the bracket is manufactured from sheet metal.

19. The circuit board assembly of claim 15, wherein the connector is a D-Sub connector.

20. The circuit board assembly of claim 15, wherein the circuit board assembly complies with Revision 2.0 of the CompactPCI Specification.

21. The circuit board assembly of claim 15, wherein the height of the circuit board assembly is less than 13.71 mm.

* * * * *